(12) United States Patent
Hodges et al.

(10) Patent No.: US 9,322,570 B2
(45) Date of Patent: Apr. 26, 2016

(54) WATER-EVACUATOR FOR AIR CONDITIONER

(71) Applicant: Cessna Aircraft Company, Wichita, KS (US)

(72) Inventors: Daniel W. Hodges, Wichita, KS (US); Nallusamy Paraman, Wichita, KS (US); Robert Ferenc, Andover, KS (US)

(73) Assignee: TEXTRON INNOVATIONS INC., Providence, RI (US)

( * ) Notice: Subject to any disclaimer, the term of this patent is extended or adjusted under 35 U.S.C. 154(b) by 494 days.

(21) Appl. No.: 13/664,026

(22) Filed: Oct. 30, 2012

(65) Prior Publication Data

US 2013/0312432 A1 Nov. 28, 2013

Related U.S. Application Data

(60) Provisional application No. 61/651,908, filed on May 25, 2012.

(51) Int. Cl.
| | |
|---|---|
| *F25D 21/14* | (2006.01) |
| *F24F 13/22* | (2006.01) |
| *B23P 6/00* | (2006.01) |
| *B64D 13/06* | (2006.01) |

(52) U.S. Cl.
CPC . *F24F 13/22* (2013.01); *B23P 6/00* (2013.01); *B64D 13/06* (2013.01); *Y10T 29/49721* (2015.01)

(58) Field of Classification Search
CPC ..... F25D 21/14; F25D 2321/14; F25D 21/00; F25B 13/22; F25B 47/006; F24F 2013/22; F24F 13/22; F24F 13/222
USPC .............. 62/285, 290, 150, 288, 289; 55/421, 55/428, 466
See application file for complete search history.

(56) References Cited

U.S. PATENT DOCUMENTS

| | | | | |
|---|---|---|---|---|
| 4,918,935 | A * | 4/1990 | Trent | 62/93 |
| 6,584,795 | B1 * | 7/2003 | Bruss | 62/285 |
| 7,543,458 | B1 | 6/2009 | Wurth | |
| 2006/0053818 | A1 * | 3/2006 | Yoshida | 62/285 |
| 2010/0212347 | A1 * | 8/2010 | Kim et al. | 62/285 |

* cited by examiner

*Primary Examiner* — Marc Norman
*Assistant Examiner* — David Teitelbaum
(74) *Attorney, Agent, or Firm* — Lathrop & Gage LLP

(57) ABSTRACT

A system and method for removing condensate from an air conditioning unit is disclosed. A conduit includes an outlet portion that is connected to a chamber of a housing of the unit at a first location, and an inlet portion that is connected to the chamber at a second location where condensate accumulates. A gravitational separator portion which extends below the second location is connected to the outlet portion and the inlet portion. A draining portion having an orifice for allowing condensate to exit the conduit is connected to the gravitational separator portion below the second location. The first location is chosen such that during operation of the unit the pressure at the first location is less than the pressure at the second location.

16 Claims, 7 Drawing Sheets

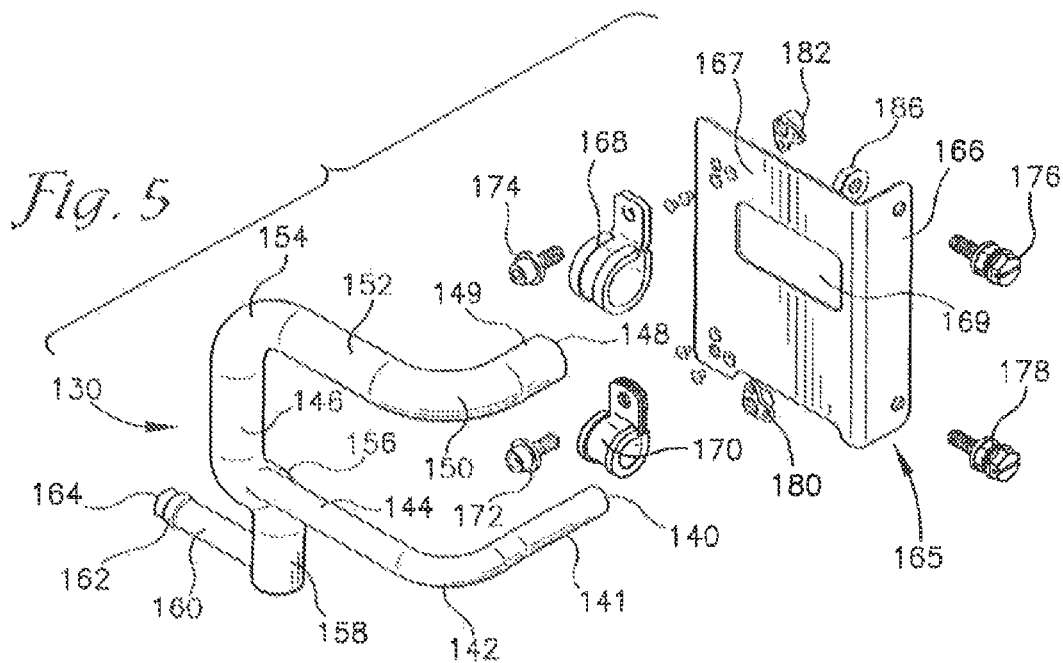
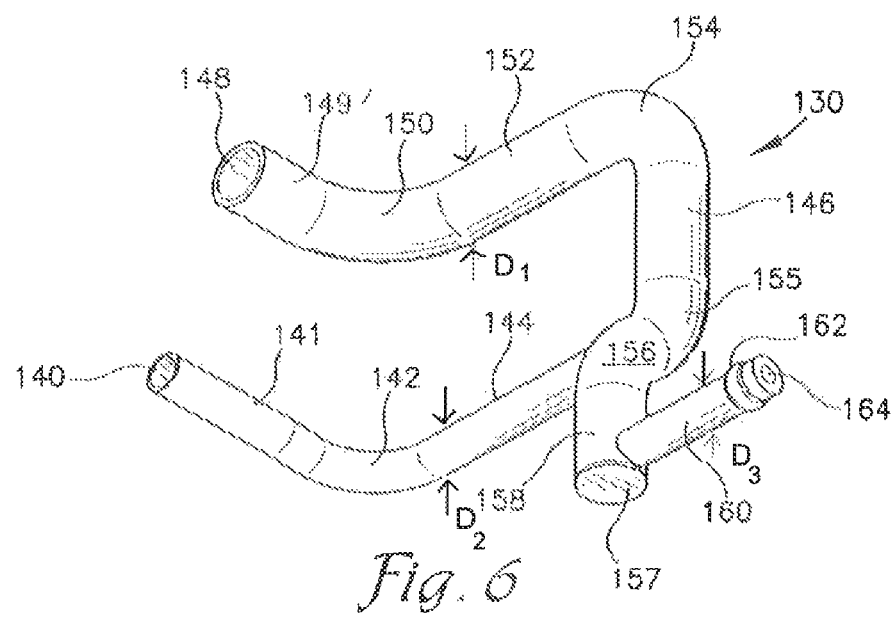

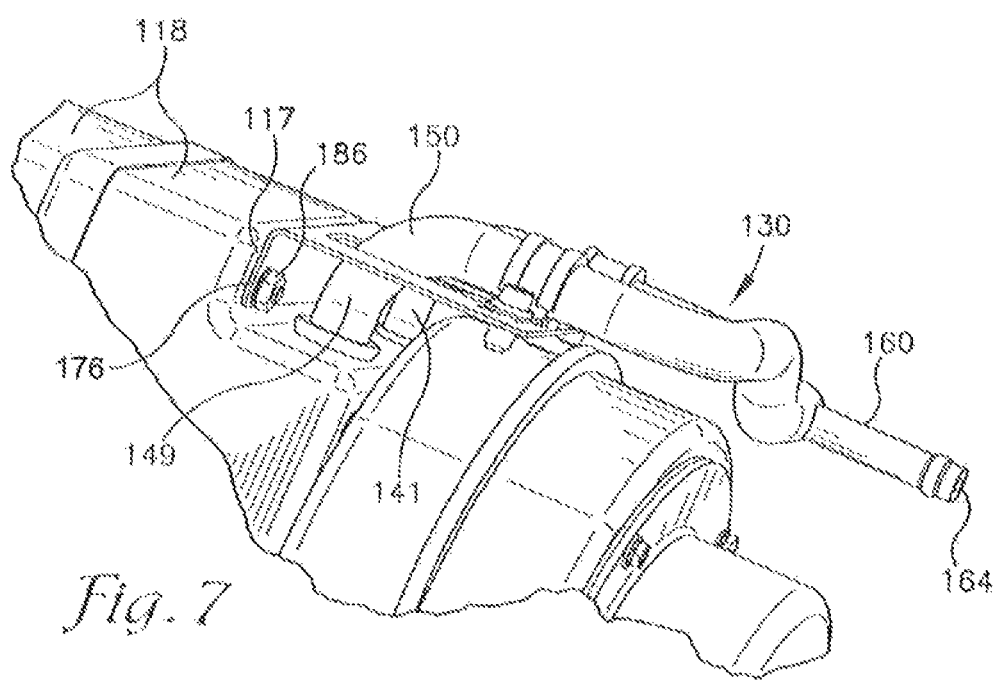

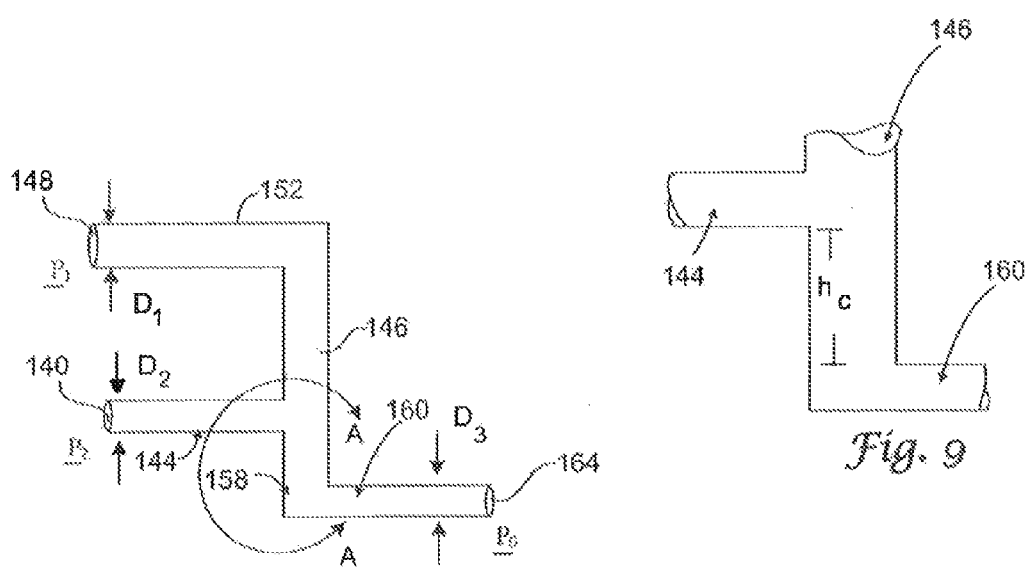
Fig. 9
Fig. 10
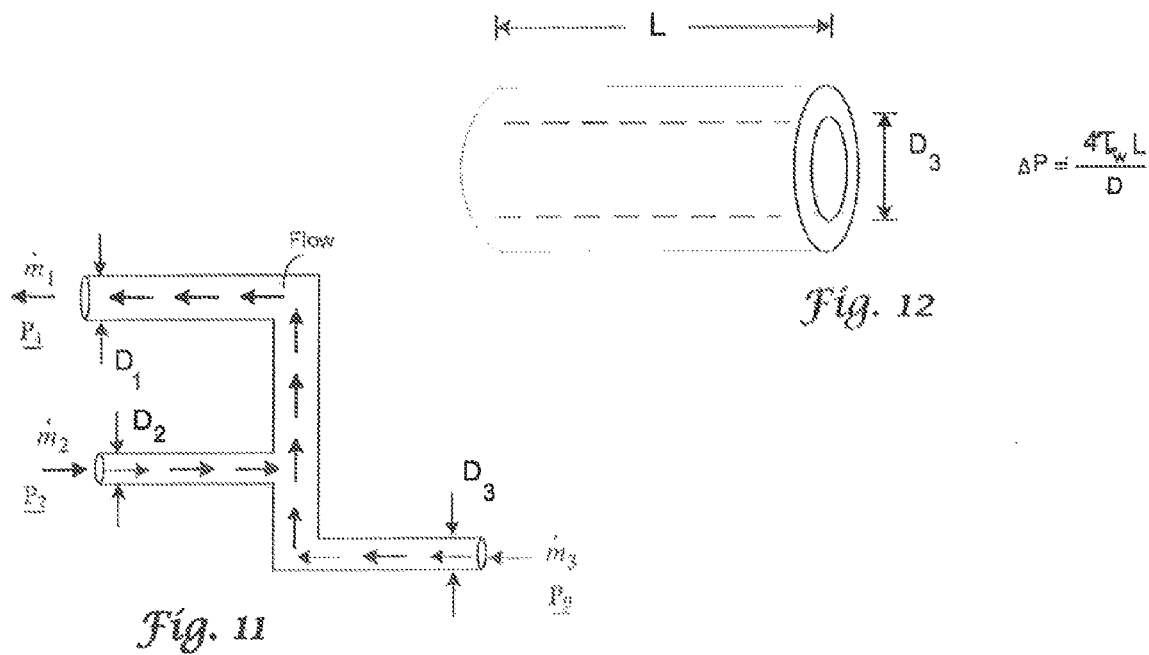
Fig. 11
Fig. 12
$$\Delta P = \frac{4\tau_w L}{D}$$

WATER-EVACUATOR FOR AIR CONDITIONER

CROSS-REFERENCE TO RELATED APPLICATIONS

This application claims priority to U.S. Provisional Patent Application No. 61/651,908 filed May 25, 2012, the disclosure of which is incorporated herein by reference in its entirety.

BACKGROUND OF THE INVENTION

1. Field of the Invention

The invention relates generally to the field of removing a liquid using pressure differentials and gravitational forces. More specifically, the invention relates to the field of removing condensation from confined air conditioning modules, e.g. aircraft air conditioning modules.

2. Description of the Related Art

Air conditioning units are well known in the art, and various methods have heretofore been utilized to drain and dispose the condensate that is generated by air conditioners during cooling cycles. For example, condensate generated by air conditioning units in commercial buildings may be drained using pumps and disposed into rain gutters. Condensate generated by air conditioning units in automobiles may be drained using gravity and disposed on the ground underneath the automobiles via drain tubes.

Air conditioning units used in aircraft may include vapor cycle evaporator drain systems to effectuate drainage of the condensate. FIG. 1 shows an exemplary aircraft air conditioning unit. As can be seen from this figure, the air conditioning unit includes a housing having an angled face, and a drain tube extending from this angled face is used to drain the condensate generated by the unit. If the blower motor is located close to the drain tube, effectiveness of the drain tube during operation of the air conditioning unit is significantly hampered. Specifically, air that is sucked into the unit's housing because of fan suction causes the pressure inside the housing to exceed the ambient pressure, which in-turn prevents the condensate from draining out the drain tube. The condensate thus forms a pool at the floor of the housing, and is often undesirably sprayed out the exhaust, causing damage to the aircraft's interior and inconveniencing the passengers. A common prior art solution to this problem is to locate the blower at an appreciable distance from the evaporator box. However, due to the limited space available in aircraft, this solution is not always feasible.

U.S. Pat. No. 7,543,458 to Wurth is directed to a portable vapor cycling air conditioning unit for use with small aircraft. Wurth ('458) discloses the use of a Venturi drainage system to drain the accumulated condensate. Condensate is conducted from the evaporator via a drain pipe to one or more extraction Venturi tubes that are positioned in a low pressure area in a blower. Forced air from the blower passes over the Venturi tubes and draws the moisture out of the unit. A ducting system is provided to draw air from outside the aircraft and to dispose of condensate and waste heat outside the aircraft.

SUMMARY

Systems and methods for draining condensate from air conditioning units are disclosed herein. According to an embodiment, a system for removing condensate from an air conditioning unit comprises a conduit including an outlet portion that is connected to a chamber of a housing of the unit at a first location. The conduit includes an inlet portion that is connected to the chamber at a second location where condensate accumulation occurs. A gravitational separator portion which extends below the second location is connected to the outlet portion and the inlet portion. A draining portion having an orifice for allowing condensate to exit the conduit is connected to the gravitational separator portion below the second location. The first location is chosen such that during operation of the unit the pressure at the first location is less than the pressure at the second location.

According to another embodiment, a method for removing condensate from an air conditioning unit that includes a housing, a blower, coils, an air intake duct, and an exhaust is disclosed. The method includes the step of determining a first location within the housing where air pressure is lower than at a second location. The second location is below the first location and condensate pools at the second location. A first conduit with a first internal diameter is located at the first location, and a second conduit with a second internal diameter is located at the second location. The first and second conduits are connected to a third conduit having a third internal diameter which is generally equal to the first internal diameter. The third conduit extends generally vertically below the second location. A fourth conduit with a fourth internal diameter is connected to the third conduit below the second location. The fourth internal diameter is chosen to be less than the first internal diameter and the second internal diameters. The fourth conduit has an orifice for allowing condensate to exit the fourth conduit.

According to yet another embodiment, a method for retrofitting a drainage system in an aircraft air conditioning unit comprises the step of removing a drain pipe from a housing of the unit and plugging a hole from which the drain pipe extended. A first location within the housing is determined where air pressure is lower than at a second location during operation of the unit. The second location is below the first location and condensate pools at the second location. A first conduit with a first internal diameter is located at the first location, and a second conduit with a second internal diameter is located at the second location. The first and second conduits are connected to a third conduit having a third internal diameter which is generally equal to the first internal diameter. The third conduit extends generally vertically below the second location. A fourth conduit with a fourth internal diameter is connected to the third conduit below the second location. The fourth internal diameter is chosen to be less than the first internal diameter and the second internal diameters. The fourth conduit has an orifice for allowing condensate to exit the fourth conduit.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein:

FIG. 5 is an assembly drawing showing certain equipment used to install the water evacuator system.

FIG. 6 is a perspective view of the water evacuator system.

FIG. 7 shows the outside of the housing of the aircraft air conditioning system of FIG. 2 illustrating the location of installation of the water evacuator system.

FIG. 9 shows a height of a drop between an induction tube and the drain of the water evacuator system, FIG. 10 shows the inner diameters of the water evacuator system's conduits and drain, as well as the corresponding pressures.

FIG. 11 shows the inner diameters of the water evacuator system's conduits and drain, as well as the corresponding mass flow rates.

FIG. 12 shows the pressure loss per unit length,

DETAILED DESCRIPTION

Embodiments of the present invention provide systems and a method for removing condensate from an air conditioning unit in which size and/or weight are restricted.

Figure 1:
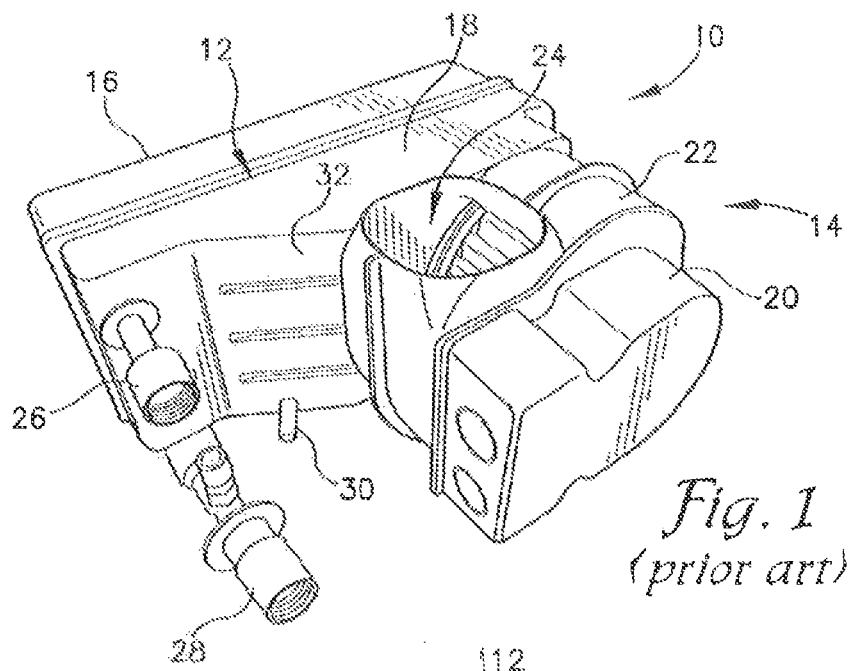
FIG. 1 is a perspective view of an aircraft air conditioning system having a prior art drainage system.

A prior art version of an aircraft air conditioning drainage system is shown in FIG. 1. Referring to the figure, an air conditioning unit 10 has both a cooling portion 12 and an air-handling portion 14. The cooling portion 12 receives unconditioned air from an intake 16 into a chamber inside a housing 18 which includes cooling coils (coils 134 shown in FIG. 3). The air-handling portion 14 includes a motor with housing 20 used to operate a blower 22 in a known manner. Air received into intake 16 is drawn through the heat-exchanging coils in the housing 18 and then out an exhaust 24. The coils receive a circulation of a heat-transfer medium (e.g., refrigerant R-12, R134) from conduits, e.g., hoses or pipes, through connections made into couplers 26 and 28 in a known fashion.

In operation, the heat-exchanging coils in the chamber in the housing 18 develop condensate which drips to form a pool at the floor of the housing 18. This pooling of condensate has been conventionally handled using a drain tube 30 which extends out from an angled side face 32 of the prior art air conditioning unit 10 shown in FIG. 1. The effectiveness of the drain tube 30 is limited. With the blower motor on, the drain 30 does not eliminate pooling within the chamber in the housing 18, and therefore, a significant amount of condensate remains at the floor of the housing 18 and on the heat-exchanger coils. Specifically, the ambient barometric pressure at the far end of drain tube 30 is greater than pressure inside the housing chamber due to fan suction, so air is sucked into housing 18 and water does not drain properly. Because of this, sudden blasts of water are emitted out of the exhaust 24 when the amount of water collected is high. The sprayed water can cause water damage to the aircraft interior, and also disturb passengers. Water will only drain properly from the air conditioning unit 10 when the motor is off and the pressure is equalized.

Figure 2:
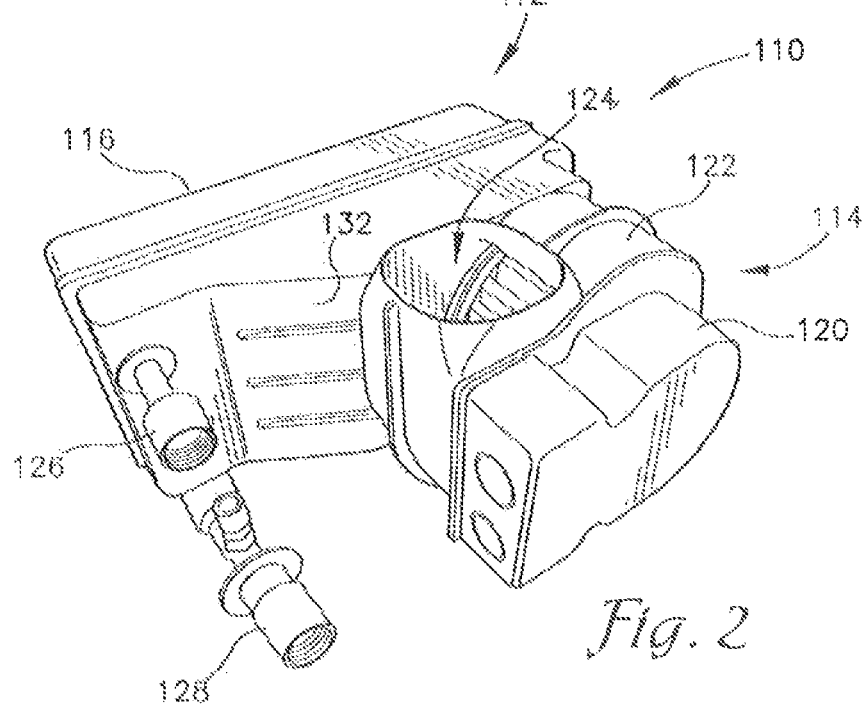
FIG. 2 is a perspective view of the aircraft air conditioning system of FIG. 1 having a water evacuator system in accordance with the teachings of the current invention.

FIGS. 2-13 illustrate an improvement over the arrangement shown in FIG. 1. Referring first to FIG. 2, it can be seen that much of the system is just like the prior art version shown in FIG. 1. As shown, air conditioning unit 110 of FIG. 2 has both cooling 112 and air-handling 114 portions, an air intake 116, a housing 118 for cooling coils 134 (see FIG. 3), a motor with housing 120, a blower 122, an exhaust 124, couplers 126 and 128, and an angled side face 132, all like in the conventional air conditioning unit 10 shown in FIG. 1.

Looking at the angled side face 132 in FIG. 2 reveals, however, that the drain tube 30 seen in FIG. 1 has been removed, and the hole where the stem existed has been eliminated. Where a retrofit is made to an existing air conditioning unit in the field, the tube 30 may be removed, and the hole from which drain tube 30 emanates may be plugged or otherwise sealed. Where the air conditioning unit 110 is anew fabrication, it can be designed with a housing 118 that does not include a drain stem (stem 30 is removed as shown in FIG. 2).

Figure 3:
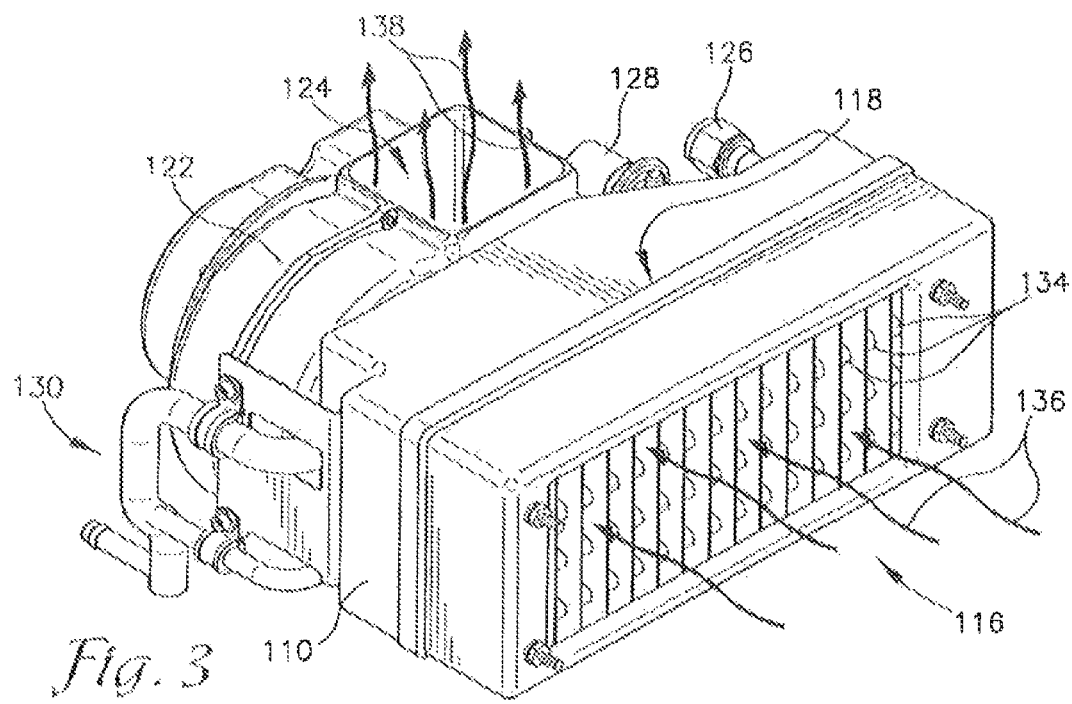
FIG. 3 is a perspective view of the aircraft air conditioning system of FIG. 2 showing air intake and exhaust duct arrangements.
Figure 4:
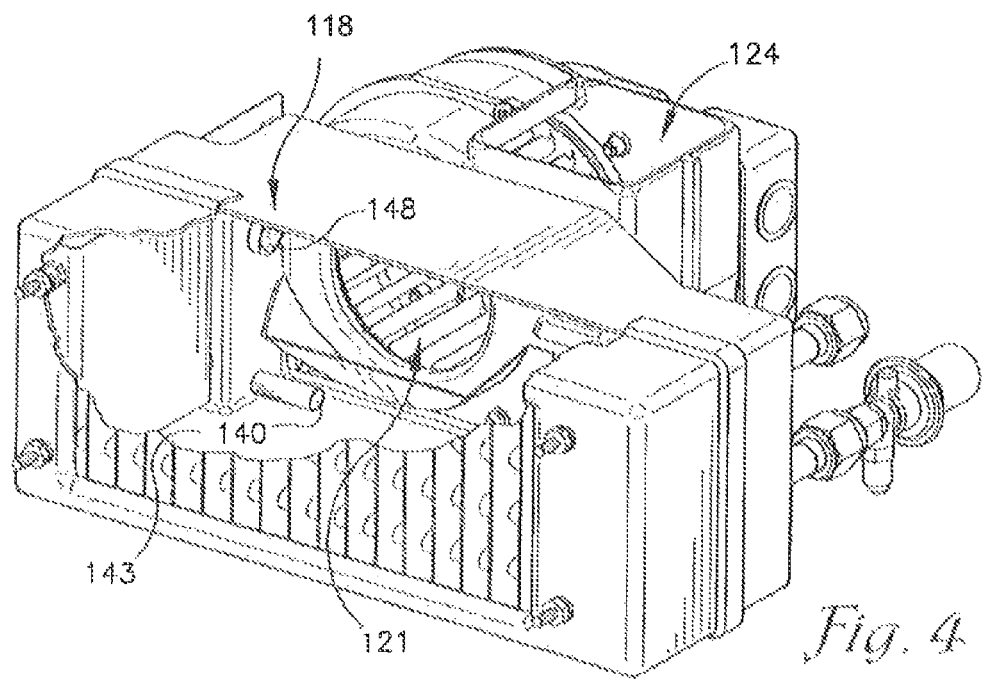
FIG. 4 is a perspective view of the aircraft air conditioning system of FIG. 2 with a part of a housing and coils of an internal chamber removed to reveal locations of ports of the water evacuator system.

Referring to FIG. 3, it can be seen that a condensation removal device 130 (a system of conduits) has been added to the overall air conditioning unit 110 on the side of the housing 118 where the blower 122 is attached. Known through analysis of experimentation, device 130 accesses a low pressure location in the housing 118 and uses the resulting suction to draw condensate out of the unit 110. The condensate is then taken out of the flowing air using a gravitational drain. The front of the housing 118 and the internal heat exchanger coils have been cut away in FIG. 4 to reveal where an induction port 140 draws condensate from the floor 143 of the housing 118 where most of the condensate accumulation occurs. Another port 148 is connected into the chamber at a location where pressure is lower than at the induction port 140. The force from the weight of the water further reduces the pressure at the inlet 140, thus providing more potential energy, or pressure differential, so the water will actively seek the lower pressure inlet 148. It has been determined that the location of port 148 as shown in FIG. 4 is optimal because it is (i) immediately outside of the mouth 121 of the blower; (ii) above a horizontal plane which passes through a center axis of the blower; and, (iii) on the side opposite the blower exhaust 124, and as such, is exposed to especially low pressure. This creates the suction necessary to remove the condensate through port 140.

The specifics regarding the conduit system 130 which performs the condensation removal can be seen in FIGS. 5 and 6. Beginning with the induction port 140, a straight portion 141 may extend to an elbow 142, then into another straight portion 144 where it may be connected into an elbow 156 which is a part of the drainage portion of the device 130.

The low pressure/suction port 148 may be incorporated into the conduit system 130 via straight section 149, which may extend to an elbow 150. A straight section 152 may extend from the elbow 150 to an elbow 154. A vertical gravitational separation section 146 may extend from the elbow 154 to an elbow 155, which may connect to a reverse elbow 156. A straight drainage section 158 may extend beneath the reverse elbow 156. The straight drainage section 158 may be capped from below by a flat bottom 157. A metered drainage stem 160 may extend from section 158 and may have an orifice 164. Stem 160 may extends horizontally and backwards relative to the unit 110. A rib 162 may be used to receive a hose or tubing (not shown) and secure it over and onto the drainage stem 160. This hose (or tubing) may drain the condensate to: (i) outside the aircraft, (ii) a temporary storage vessel, or (iii) some other vessel or conduit network so that the condensate may be recycled and used for some purpose inside the aircraft.

FIG. 5 also shows the devices used to secure the condensate removal device 130 onto the housing 118. First, a bracket 165, which may comprise a large flange 167 and a short flange 166, may be fastened onto a shelf 117 made into the housing 118 as can be seen in FIG. 7. A pair of screws 176 and 178 may be installed into nuts (only one nut 186 is visible in FIG. 7) from inside the housing 118.

A large collar 168 and a small collar 170 may be used to secure ends of the low pressure/suction port 148 and the induction port 140, respectively, to the large flange 167 as shown in FIG. 5 using fasteners 172, 174 and receiving nuts 180, 182. The end of the low pressure port 148 may pass through a rectangular aperture 169 formed in the bracket 165. FIG. 7 shows where and how the ends of the low pressure and induction ports (148 and 140, respectively) are connected to the outer wall of the housing 118.

Figure 8:
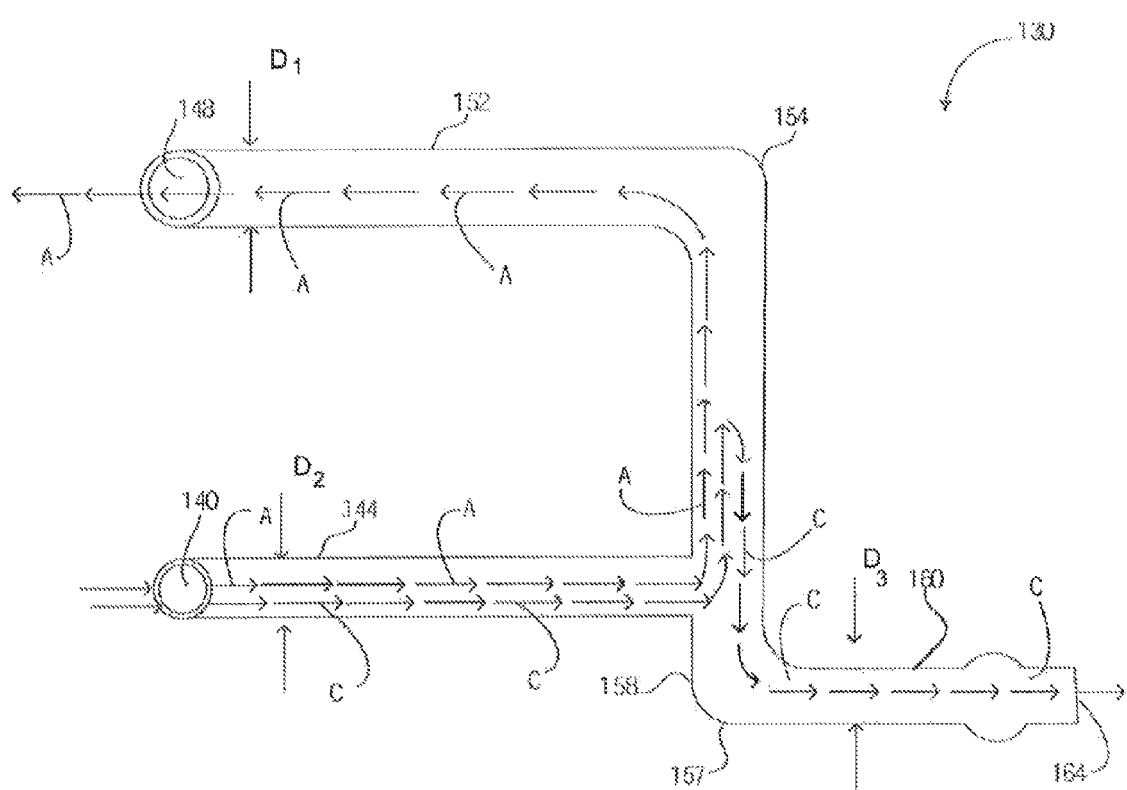
FIG. 8 shows inner diameters of conduits and a drain of the water evacuator system, and includes arrows depicting the flow of air and condensation.

FIG. 8 shows the internals of conduit network 130, and the movement of both air (A) and condensate (C) using arrows so labeled. As can be seen in the figure, low pressures at port 148 may cause air (A) to be drawn into induction port 140, up vertical gravitational separation section 146, and then out the port 148. When this occurs, condensate (C) is pulled into port 140 along with the air (A). Once the vertical section 146 is reached, however, the condensate (C) may separate from the air (A) as shown. This is due to gravity, in that the relatively lower pressures existing at port 148 result in the air (A) to be drawn up and out port 148, while the condensate (C), which is too heavy, separates from the airflow. Once separated, the condensate (C) drops down into section 158 and exits from the drain stem 160 (i.e., orifice 164), where it may be recycled or discarded (e.g., by using drain hose or tubing (not shown)).

Referring now to FIG. 9, a value for height $h_c$ is determined which will result in the water condensate C to drain out tube 144 into tube 146 and be emitted out of the metered drainage system 160. The pressures $P_1$, $P_2$, and $P_0$ (FIG. 10) at the orifices of device 130 drive the water evacuation process. Pressure seen at orifice 148 ($P_1$) is less than the pressure seen at orifice 140 ($P_2$) which is less than the ambient pressure ($P_0$) seen at orifice 164 of the metered drainage system 160. That is:

$$P_1 < P_2 < P_0$$

Variable $h_c$, the height necessary in tube 158 for proper draining, is measured from the lower part of the connection of tube 144 and 158 to the upper part of the connection of tube 164 and 158 (see FIGS. 9 and 10). $h_c$ can be determined according to the following relationship:

$$P_1 = \lambda \cdot h_c$$

Resulting in:

$$h_c = abs\left|\frac{P_1}{\lambda}\right|$$

where:

$\lambda$ = Specific weight of the pool fluid $abs\|$ = Absolute value of $\frac{P_1}{\lambda}$ $P_1$ = Gauge Pressure at port 148.

Variable $h_c$, as determined, is the minimum height necessary. It is permissible (and recommended) to make the height, $h_c$ some percentage greater than the minimum (e.g., 10%-25% higher). This design factor of safety will account for any pressure or voltage transients.

The inner diameters ($D_1$, $D_2$, $D_3$) of each of conduit sections 152, 144, and 160 play a significant role in draining the fluid properly. Inner diameter $D_1$, in the preferred embodiment, exists not only at orifice 148, but also through portion 149 (see FIG. 6), around bend 150, through the length of portion 152, down through bend 154 and the length of vertical gravitational separator portion 146 all the way to floor 157. A second inside diameter $D_2$ exists not only at orifice 140, but also the length of portion 144 until it feeds into the vertical separator portion 146. A third diameter $D_3$ exists not only at orifice 164 but also along the entire length of drain stem 160.

These diameters ($D_1$, $D_3$) have been proportioned in a manner that creates a desired result in the vertical separator portion 146. This effect is symbolized, and can be best understood by following the paths of the arrows representing airflow (A) and condensate flow (C) in FIG. 8. As the suction is administered at orifice 140 as the result of the relatively low pressure existing at orifice 148, both air (A) and any condensate in the proximity of orifice 140 are drawn into and along portion 144. Upon reaching the vertical separator portion 146, the air (A) will continue to rise, travel around bend 154 and exit the system at orifice 148 into the low pressure area in the chamber near the mouth 121 of the blower (see FIG. 4). The condensate (C), however, because it has a higher specific weight than the air (A), becomes separated upon reaching the vertical separator portion 146, drops to floor 157, collects and then passes through stem 160, and out orifice 164 into the drain tubing/hose (not shown).

Quantification of the relationship between inner diameters $D_1$, $D_2$ and $D_3$ is critical in optimizing drainage capability. Referring to FIG. 11, $\dot{m}_1$, $\dot{m}_2$, $\dot{m}_3$ are the mass flow rates at orifices 148, 140, and 164, and each instance, is determined according to the formula:

$$\dot{m} = \rho \cdot V \cdot A$$

where: $\rho$ = Fluid Density

V = Fluid Velocity

A = Tube Cross-Sectional Area

In order to optimize water drainage into port 140, and subsequently out of orifice 164, it is necessary to optimize $D_1$, $D_2$ and $D_3$ such that $\dot{m}_2$ is greatest.

The first mode of operation analyzed is when there is no water in the system.

$$\dot{m}_1 - \dot{m}_2 - \dot{m}_3 = 0$$

$$\rho_1 \cdot V_1 \cdot A_1 - \rho_2 \cdot V_2 \cdot A_2 - \rho_3 \cdot V_3 \cdot A_3 = 0$$

where: $\rho_1 = \rho_2 = \rho_3$

Knowing:

$$A_1 = \pi \cdot \left(\frac{D_1}{2}\right)^2$$

$$A_2 = \pi \cdot \left(\frac{D_2}{2}\right)^2$$

$$A_3 = \pi \cdot \left(\frac{D_3}{2}\right)^2$$

where:

$D_1$ = Tube Diameter at orifice 148
$D_2$ = Tube Diameter at orifice 140
$D_3$ = Tube Diameter at orifice 164

Simplified:

$$V_1 \cdot A_1 - V_2 \cdot A_2 - V_3 \cdot A_3 = 0$$

$$Q_1 - Q_2 - Q_3 = 0$$

Where:
$Q_1$=Volumetric Flow Rate at orifice 148
$Q_2$=Volumetric Flow Rate at orifice 140
$Q_3$=Volumetric Flow Rate at orifice 164

Ideally $Q_3$, or the volumetric flow rate through orifice 164, should be no more than 5% that of $Q_1$. This means that there should be no more than a 5% pressure loss from $Q_1$ as a result of $D_3$, which in-turn means that $D_3$ will be smaller than $D_1$ or $D_2$.

However, $D_3$ should not be so small that it restricts the collected condensate from draining properly. The minimum drain diameter $D_3$ for allowing collected condensate to properly drain may be computed as follows:

$$Q_3 = V_{Jet} \cdot A_3$$

where: $V_{Jet}$=Fluid Exit Velocity Due to Gravity
$A_3$=Tube Cross-Sectional Area at $D_3$
and:

$$V_{Jet} = \sqrt{2 \cdot g \cdot h_c}$$

where: g=Acceleration Due to Gravity
$h_c$=Height in tube 158

In small systems, typical values of $Q_3$ will be between 0.5 and 1 in$^3$/sec. The goal is to find a specific value or optimum range for $D_3$. By using the equations above to solve for $D_3$:

$$D_3 = \frac{\sqrt{2 \cdot Q_3 \cdot \pi \cdot g \cdot h_c} \cdot \sqrt[4]{2 \cdot g \cdot h_c}}{\pi \cdot g \cdot h_c}$$

This is the minimum value of $D_3$ such that the pooled condensate will adequately flow out of the system. People of skill in the art will appreciate that the equation above may be used to approximate or calculate the minimum value of $D_3$, and that a conduit section of the next standard size above this approximated or calculated value may be utilized in the device 130.

As stated above should be no more than 5% of $Q_1$. This sets the maximum value for $Q_3$.

So:

$$Q_3 = \frac{1}{20} \cdot Q_1$$

$$\frac{\pi \cdot D_3^2 \cdot V_3}{4} = \left(\frac{1}{20}\right) \cdot \frac{\pi \cdot D_1^2 \cdot V_1}{4}$$

Reduces to:

$$D_3^2 \cdot V_3 = \left(\frac{1}{20}\right) \cdot D_1^2 \cdot V_1$$

For simplicity, if $V_3 = V_1$ then, $$D_3 = 0.224 \cdot D_1$$

Or:

$$\frac{\sqrt{2 \cdot Q_3 \cdot \pi \cdot g \cdot h_c} \cdot \sqrt[4]{2 \cdot g \cdot h_c}}{\pi \cdot g \cdot h_c} < D_3 < .224 \cdot D_1$$

Another way to ensure that pressure P3 is less than pressures P1 and P2 is to create a pressure drop.

The pressure drop caused by tube shear stress (see FIG. 12) is:

$$\Delta P = 4 \cdot \tau_w \cdot \left(\frac{L}{D}\right)$$

where:
$\Delta P$=Pressure loss in tube
L=Tube length
D=Tube diameter
$\tau_w$=Tube wall shear stress Referencing the formula above, in order to make $\Delta P \to \infty$, either $\tau_w$ needs to be very large or $$\left(\frac{L}{D}\right)$$

needs to be very large. L, or the length of tube 160, can be made to be long enough to cause a great enough pressure drop within tube 160.

Continuing from above for the equal density mode:

$$Q_1 - Q_2 - Q_3 = 0$$

$$Q_1 - Q_2 - \frac{1}{20}Q_1 = 0$$

$$\frac{19}{20}Q_1 - Q_2 = 0$$

$$Q_2 = \frac{19}{20}Q_1$$

Where:
$$Q_1 = V_1 \cdot A_1$$
$$Q_2 = V_2 \cdot A_2$$

Expanded:

$$V_2 \cdot A_2 = \frac{19}{20} V_1 \cdot A_1$$

Where:

$$V_1 = \left(\frac{-2 \cdot P_1}{\rho_1}\right)^{\frac{1}{2}}$$

$$V_2 = \left(\frac{2 \cdot (P_2 - P_1)}{\rho_2}\right)^{\frac{1}{2}}$$

$P_1$=Gauge Pressure at Orifice 148
$P_2$=Gauge Pressure at Orifice 140
$\rho_1$=Fluid density at Orifice 148
$\rho_2$=Fluid density at Orifice 140

Resulting:

$$\left[\frac{D_2}{D_1}\right] = \left[\frac{-P_1}{[P_2 - P_1]}\right]^{\frac{1}{4}} \cdot \left[\frac{19}{20}\right]^{\frac{1}{2}}$$

The above equation is determined for the system without pooled condensate, thus there is nothing to drain. Generally the higher the pressure difference between $P_1$ and $P_2$ the smaller the change there needs to be between $D_1$ and $D_2$. Under normal conditions $P_1 < P_2$ and $D_2$ will need to be greater than $D_1$. Generally, $$D_2 \approx 1.15 \cdot D_1$$

Again, this is for a system that has similar fluid densities in all tubes.

Now for the analysis of the system with fluid condensate in tube $D_2$ $$\dot{m}_1 - \dot{m}_2 - \dot{m}_3 = 0$$

$$\rho_1 \cdot V_1 \cdot A_1 - \rho_2 \cdot V_2 \cdot A_2 - \rho_2 \cdot V_3 \cdot A_3 = 0$$

$$\rho_1 \neq \rho_2$$

Where: $\rho_3 = \rho_1$ $V_1 = V_3$ $D_3 = 0.224 \cdot D_1$

Resulting:

$$\rho_1 \cdot V_1 \cdot A_1 - \rho_2 \cdot V_2 \cdot A_2 - \rho_1 \cdot V_3 \cdot A_3 = 0$$

Simplifying:

$$0.95 \rho_1 \cdot V_1 \cdot D_1^2 = \rho_2 \cdot V_2 \cdot D_2^2$$

Resulting $$\left[\frac{D_2}{D_1}\right] = \left[\frac{-\rho_1 \cdot P_1}{\rho_2 \cdot [P_2 - P_1]}\right]^{\frac{1}{4}} \cdot \left[\frac{19}{20}\right]^{\frac{1}{2}}$$

The goal is to get some value for $D_1$ and $D_2$ that will work efficiently when there are similar and dissimilar fluid densities. Taking the root mean square obtains an average value of the two varying quantities.

$$\left[\frac{D_2}{D_1}\right]_{Total}^2 = \frac{1}{2} \cdot \left[\left[\frac{D_2}{D_1}\right]_{\rho_1 = \rho_2}^2 + \left[\frac{D_2}{D_1}\right]_{\rho_1 \neq \rho_2}^2\right]$$

$$\left[\frac{D_2}{D_1}\right]_{Total}^2 = \left[\frac{19}{40}\right] \cdot \left[\frac{-P_1}{[P_2 - P_1]} + \frac{-\rho_1 \cdot P_1}{\rho_2 \cdot [P_2 - P_1]}\right]^{\frac{1}{2}}$$

The equation above will be better used as an inequality. In this case:

$$D_3 < \left[\frac{D_2}{D_1}\right]_{Total}^2 \leq \left[\frac{19}{40}\right] \cdot \left[\frac{-P_1}{[P_2 - P_1]} + \frac{-\rho_1 \cdot P_1}{\rho_2 \cdot [P_2 - P_1]}\right]^{\frac{1}{2}}$$

Or simply stated:

$$D_3 < D_2 \leq D_1 \cdot \left[\left[\frac{19}{40}\right] \cdot \left[\frac{-P_1}{[P_2 - P_1]} + \frac{-\rho_1 \cdot P_1}{\rho_2 \cdot [P_2 - P_1]}\right]^{\frac{1}{2}}\right]^{\frac{1}{2}}$$

Thus, as can be appreciated from the equation above, $D_2$ needs to be greater than $D_3$ but less than some quantity times $D_1$.

Generally speaking, $D_1$ will be about 1.5 to 2.5 times the value of $D_2$. Using a ratio that is considerably smaller, for instance, $$D_1 \approx 0.5 \cdot D_2$$

will choke down the flow rate of the denser fluid, thus causing the flow rate to be limited through orifice 140. The effect will be a slower drain time out of orifice 140. Conversely, if the ratio is larger, $$D_1 \approx 3 \cdot D_2$$

the flow rate out of orifice 140 will be above maximum but excess pressure from $P_1$ might be lost through orifice 140. The final diameters of $D_1$ and $D_2$ should be determined through experimentation in line with manufacturing limitations.

One thing to note is that for the water to properly flow, the pressure seen at orifice 148 needs to be less than the pressure seen at orifice 140. If $P_1 > P_2$ but less than $P_0$ (ambient pressure) the water seen at port 140 will not flow out, thus causing spray. So the ratio should be:

$$\left(\frac{P_1 - P_0}{P_2 - P_0}\right) > 1$$

Also, for more efficient drainage, $(P_1 - P_0)$ needs to be greater than $(P_2 - P_0)$. Drain potential increases with the greater $(P_1 - P_0)$ is as compared to $(P_2 - P_0)$.

Figure 13A:
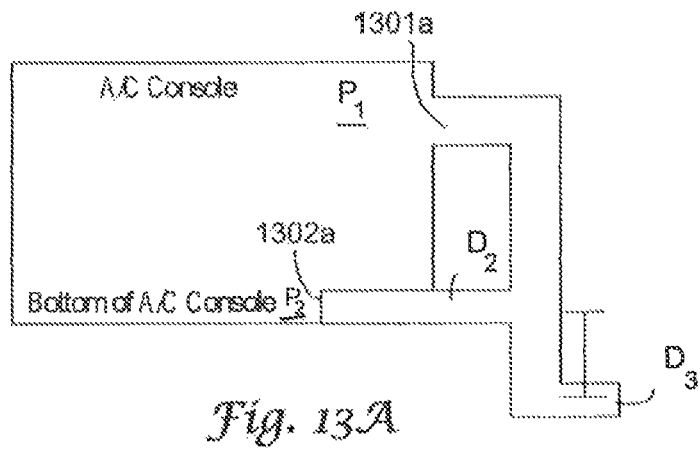
FIGS. 13A-C show possible design variations of the water evacuator system in accordance with the teachings of the current invention.
Figure 13B:
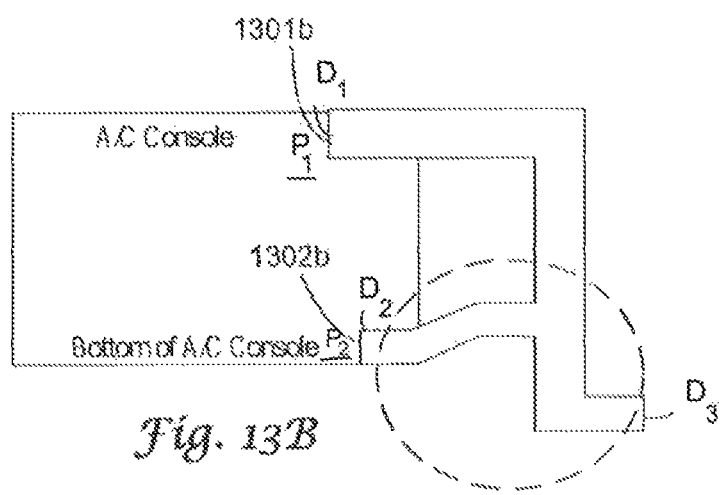
Figure 13C:
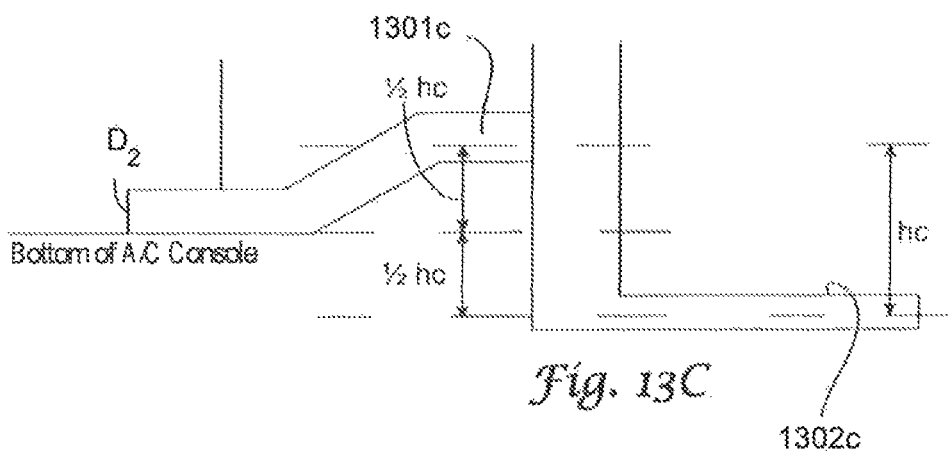

In summary, the design process begins with determining the negative pressure within air conditioning console. Specifically, the location within the console where air pressure is the lowest is determined, and the fluid induction conduit inlet (e.g., orifice 1301a in FIG. 13A; orifice 1301b in FIG. 13B) is located as near as possible to this low pressure area. Next the location in the console where condensate fluid has the propensity to collect is determined, and the fluid induction tube is located there; for example, orifice 1302a in FIG. 13A and orifice 1302b in FIG. 13B are each located at locations where condensed water will collect. Pressure values at location $P_1$ and $P_2$ are then determined.

Next, the height drop between induction tube 1301c (see FIG. 13c) and drain 1302c is determined. This is done using the relation:

$$h_c = \text{abs}\left|\frac{P_1}{\lambda}\right|$$

The drop height typically ranges from 0.5 inches to 3 inches depending on how much negative pressure is within the unit. Experimentation will determine the negative pressure within the unit.

Next, a value for $D_3$ is determined. $D_3$ needs to be large enough to allow the fluid to drain out depending on the rate of pooling, but small enough to not allow pressure loss from $P_1$ or $P_2$.

$$\frac{\sqrt{2 \cdot Q_3 \cdot \pi \cdot g \cdot h_c} \cdot \sqrt[4]{2 \cdot g \cdot h}}{\pi \cdot g \cdot h_c} < D_3 < .224 \cdot D_1$$

Based off the information above, an adequate value for diameter $D_1$ is computed.

$$D_1 \approx 4.5 \cdot D_3$$

The final criterion is to determine drain diameter $D_2$, which can be gleaned by substantially satisfying the relation:

$$D_3 < D_2 \leq D_1 \cdot \left[\left[\frac{19}{40}\right] \cdot \left[\frac{-P_1}{[P_2 - P_1]} + \left[\frac{-\rho \cdot P_1}{\rho_2 \cdot [P_2 - P_1]}\right]\right]^{\frac{1}{2}}\right]^{\frac{1}{2}}$$

The following example illustrates these computations.
Example:

$$\rho_1 = \text{air}\left(.0024 \frac{\text{slugs}}{\text{ft}^3}\right) = \left(0.0000013889 \frac{\text{slugs}}{\text{in}^3}\right)$$

$$\rho_2 = \text{water}\left(1.94 \frac{\text{slugs}}{\text{ft}^3}\right) = \left(0.0011227 \frac{\text{slugs}}{\text{in}^3}\right)$$

$$\lambda_{water} = 62.30 \frac{\text{lb}}{\text{ft}^3} = .0361 \frac{\text{lb}}{\text{in}^3}$$

$$P_1 = -.060 \text{ psi(gauge)}$$

$$P_2 = -.030 \text{ psi(gauge)}$$

$$Q_3 = .75 \frac{\text{in}^3}{\text{sec}}$$

$$h_c = \text{abs}\left|\frac{P_1}{\lambda}\right| = \text{abs}\left|\frac{-.060 \frac{\text{lb}}{\text{in}^2}}{.0361 \frac{\text{lb}}{\text{in}^3}}\right| = 1.66 \text{ inches}$$

Add 10% to account for transients $$1.66 \cdot 1.1 = 1.83 \text{ inches}$$

Now determine diameter $D_3$.

$$\frac{\sqrt{2 \cdot Q_3 \cdot \pi \cdot g \cdot h_c} \cdot \sqrt[4]{2 \cdot g \cdot h}}{\pi \cdot g \cdot h_c} < D_3$$

$$\frac{\sqrt{2 \cdot .75 \cdot \pi \cdot 386.1 \cdot 1.66} \cdot \sqrt[4]{2 \cdot 386.1 \cdot 1.66}}{\pi \cdot 386.1 \cdot 1.66} < D_3$$

$$\rightarrow \frac{\sqrt{3020.3} \cdot \sqrt[4]{1281.9}}{2013.5} < D_3$$

$$\rightarrow .1633 < D_3$$

So $D_3$ needs to be larger than 0.1633 inches.
For Manufacturing $D_3 = 0.17$
Determine diameter $D_1$.

$$D_1 \approx 4.5 \cdot D_3$$

$$D_1 \approx 4.5 \cdot 0.17$$

$$D_1 \approx 0.765 \text{ inches}$$

Rounding up:
$D_1$ will be 0.80 inches in diameter
Determine diameter $D_2$.

$$D_2 \leq D_1 \cdot \left[\left[\frac{19}{40}\right] \cdot \left[\frac{-P_1}{[P_2 - P_1]} + \left[\frac{-\rho_1 \cdot P_1}{\rho_2 \cdot [P_2 - P_1]}\right]\right]^{\frac{1}{2}}\right]^{\frac{1}{2}}$$

$$D_2 \leq .8 \cdot \left[\left[\frac{19}{40}\right] \cdot \left[\frac{-(-0.6)}{[(-.03) - (-.06)]} + \left[\frac{-(0.0000013889) \cdot (-.06)}{(0.0011227) \cdot [(-.03) - (-.06)]}\right]\right]^{\frac{1}{2}}\right]^{\frac{1}{2}}$$

$$D_2 \leq .8 \cdot \left[\left[\frac{19}{40}\right] \cdot [2 + .002474]^{\frac{1}{2}}\right]^{\frac{1}{2}}$$

$$D_2 \leq .8 \cdot [.6722]^{\frac{1}{2}}$$

$$D_3 \leq D_2 \leq .656 \text{ inches}$$

$$D_2 \approx .63 \text{ inches}$$

where $D_3 = .17$ inches

It should be understood that instead of providing conduits having internal diameters which are constant lengthwise, the internal diameters could be varied and the desired fluid mechanics obtained by restricting flow through the minimum internal diameters at locations (e.g., at the orifices). Thus, it is possible that this sort of variation could be made and the desired drainage arrangement maintained.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A conduit system for removing condensate from an air conditioning unit, the air conditioning unit having a housing including a chamber and a blower, the system comprising:
    an outlet portion having a first port; the first port being directly coupled to the chamber at and abutting a first location; the first location being above a horizontal plane that passes through an internal region of the blower;
    an inlet portion having a second port configured for the entry of air and condensate; the second port being directly coupled to the chamber and abutting a second location where condensate accumulation occurs; the second location being below the blower such that a second pressure at the second port is higher than a first pressure at the first port;
    a gravitational separator portion connected to the outlet portion and the inlet portion; the gravitational separator portion extending below the second location and having a capped end;
    a draining portion having an orifice for allowing condensate to exit the conduit, the draining portion connected to the gravitational separator portion below the second location and above the capped end.

2. The system of claim 1 wherein the air conditioning unit is configured for use in an aircraft.

3. The system of claim 1 wherein:
the outlet portion has a first diameter;
the inlet portion has a second diameter; and
the first diameter is greater than the second diameter.

4. The system of claim 3 wherein the draining portion has a third diameter that is less than the first diameter.

5. The system of claim 4 wherein the third diameter is less than the second diameter.

6. The system of claim 5 wherein the first diameter is less than 2.5 times the second diameter.

7. The system of claim 6 wherein the first diameter is about 4.5 times the third diameter.

8. A system for removing condensate from a draw-through air conditioning unit for an aircraft, the air conditioning unit having a housing including a chamber, a blower, coils, an air intake duct, and an exhaust, the system comprising:
a conduit comprising:
an outlet portion having a first segment, a second segment, and a first port; the first and the second segments each being substantially straight and being connected to each other with a first elbow; each of the first segment, the second segment, and the first elbow lying in a first horizontal plane; the first and the second segments lying in different vertical planes; the first port being coupled to the chamber at a first location which is above a second horizontal plane that passes through an internal region of the blower;
an inlet portion having a first section, a second section, and a second port configured for the entry of air and condensate; the first and the second sections each being substantially straight and being connected to each other with a second elbow; each of the first section, the second section, and the second elbow lying in a third horizontal plane that is below and parallel to the first horizontal plane; the second port being coupled to the chamber at a second location where condensate accumulation occurs;
a gravitational separator portion connected to the outlet portion and the inlet portion, the gravitational separator portion extending below the second location and having a capped end; and
a draining portion having an orifice for allowing condensate to exit the conduit, the draining portion connected to the gravitational separator portion above the capped end.

9. The system of claim 8 wherein the conduit generally resides outside the housing.

10. The system of claim 9 wherein:
the conduit is of unitary construction; and
during operation of the air conditioning unit a first pressure at the
second location is less than a second pressure at the orifice.

11. The system of claim 10, wherein:
the outlet portion and the gravitational separator portion have a first internal diameter;
the inlet portion has a second internal diameter;
the draining portion has a third internal diameter; and
the third internal diameter is less than the second internal diameter.

12. The system of claim 11 wherein the second internal diameter is less than the first internal diameter.

13. The system of claim 11 wherein the first internal diameter is greater than the second internal diameter and less than 2.5 times the second internal diameter.

14. The system of claim 11 wherein the first internal diameter is about 4.5 times the third internal diameter.

15. The system of claim 11 wherein the first internal diameter is about 0.80 inches, the second internal diameter is about 0.63 inches, and the third internal diameter is about 0.17 inches.

16. The system of claim 11 wherein:
the inlet portion has a top surface and a bottom surface;
the draining portion has a top surface and a bottom surface; and
a vertical distance between the inlet portion bottom surface and the draining portion top surface is between about 0.5 inches and about 3 inches.

* * * * *